2,515,877

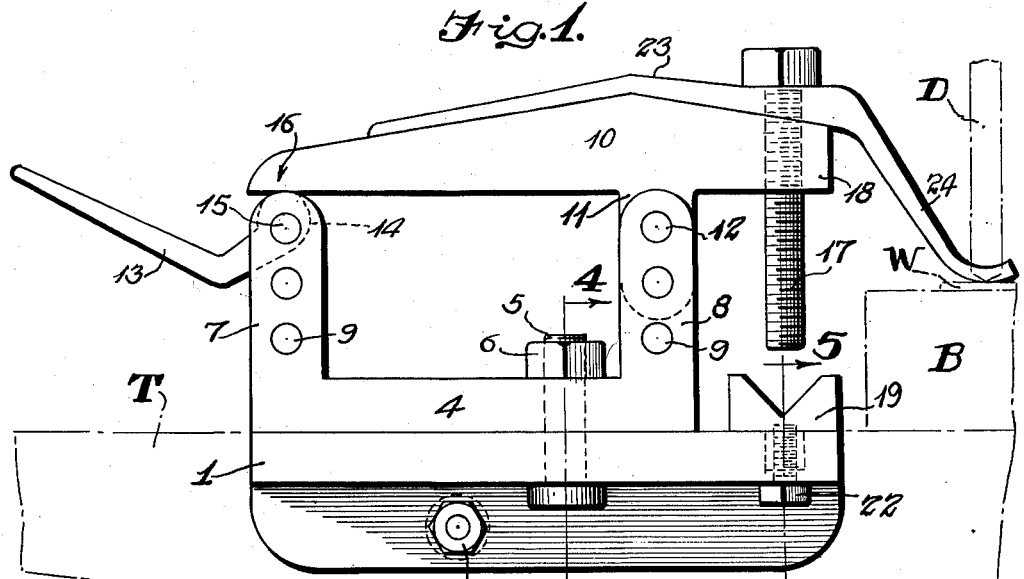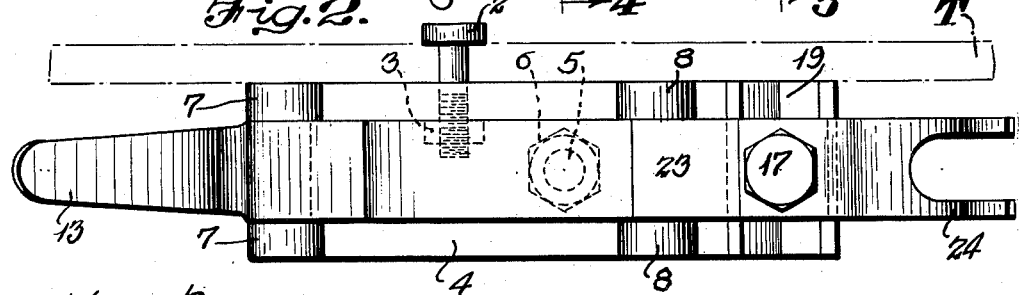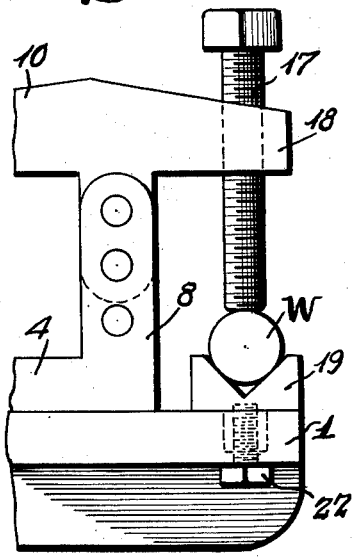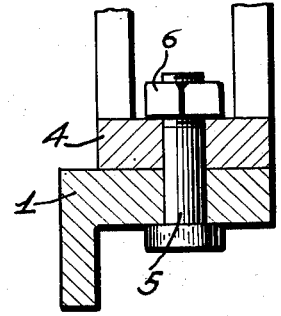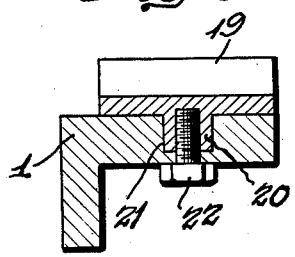
INVENTOR.
Spencer R. Keller.
BY Victor J. Evans & Co.
ATTORNEYS Patented July 18, 1950

UNITED STATES PATENT OFFICE 2,515,877

CAM-OPERATED PIVOTED-JAW CLAMP HAVING PLURAL POSITIONS FOR CAM AND JAW FULCRUMS

Spencer R. Keller, Handley, W. Va., assignor to Marathon Coal Bit Company, Incorporated, Montgomery, W. Va., a corporation of West Virginia Application July 14, 1947, Serial No. 760,829

3 Claims. (Cl. 144—290)

1

My present invention relates to the general class of portable clamps or work holders, and more specifically to a cam-operated pivoted-jaw clamp having plural positions for cam and jaw fulcrums of the type actuated by a pivoted lever and adapted for use on the table or bench of drill presses, welding, and cutting tools, and other machine tools, as a work holder.

The object of the invention is to provide a jaw clamp which is adapted to be operated by a cam, the clamp serving to hold work pieces of various shapes and sizes whereby an operator can use a drill press, milling, or other machine on the work piece as desired.

Another object of the invention is to provide a clamp which is extremely simple and inexpensive to manufacture.

Other objects and advantages will be apparent during the course of the following description.

In the accompanying drawings I have illustrated a complete example of a physical embodiment of my invention in which the parts are combined and arranged in accord with one mode I have devised for the practical application of the principles of my invention. It will, however, be understood that changes and alterations are contemplated and may be made in these exemplifying drawings and mechanical structures, within the scope of my claims, without departing from the principles of the invention.

Figure 1 is a view in side elevation of a unitary clamping unit in which my invention is embodied, and shown in operative position.

Figure 2 is a top plan view of the structure in Fig. 1.

Figure 3 is a view in elevation at the work-holding end of the clamp.

Figure 4 is a transverse detail sectional view at line 4—4 of Fig. 1 showing the hold-down bolt for the clamp frame; and Figure 5 is a detail sectional view at line 5—5 of Fig. 1 disclosing the V-shape block or work holder.

In order that the general arrangement and utility of parts may readily be understood I have indicated a portion T of a drill press table upon which the appliance may be mounted for use by means of an angle bar 1 in which an attaching hole is drilled for the attaching bolt 2 that is passed through a similar hole in the table and secured by a nut 3.

The clamp frame having a base plate 4 is mounted in horizontal position on the angle bar 1 and secured thereon by a hold-down bolt 5 passed through registering holes drilled in the base plate

2 and angle bar, and the nut 6 rigidly clamps these parts together.

The clamp frame includes a pair of spaced and upright forked posts 7 and 8, preferably integral with the base plate 4, and each of the posts is provided with a series of vertically spaced bearing holes 9 for selective use with the operating parts of the clamp.

On the upright post 8 a rocker arm 10 having a perforated bearing lug 11 is mounted with a rock shaft or pin 12 passed through selected registering holes in the lug and forked post; and an operating or cam lever 13 is mounted in the spaced post 7 and provided with a cam head 14 that is journaled on pivot pin or shaft 15.

The angular cam lever 13 and its cam head 14 are proportioned, and the lever is mounted on the pivot pin so that when the lever is swung to the right in Fig. 1 to upright idle position, the center of gravity of the lever will be at the right side of the pivot, and the clamp is released. On its operating stroke, the cam lever is turned down from upright position to the clamping position of Fig. 1 to hold the work W.

The lever and its cam co-act with the long arm 16 of the rocker arm, which is located just over the cam head between the forks of the post 7, and a work-holding bolt 17 is adjustably mounted in the short arm 18 of the rocker arm for clamping the work, as W, in the work holder.

As here shown the work holder is a V-shaped or grooved block 19, rotatably adjustable to different selected angles and provided with a bottom boss 20, of cylindrical shape in cross section, that fits into a complementary socket 21 of the angle bar 1, and a locking bolt 22 is threaded upwardly through the counterbored angle bar and into the threaded boss of the block.

To accommodate small parts, as for instance a drill D in Fig. 1, the rocker arm may be equipped with an adjustable extension arm 23, that terminates in a forked end 24 for holding the drill on the base B. The extension arm conforms to the shape of the rocker arm, and the extension arm may readily be attached to the rocker arm by use of the clamp bolt 17, or when not required the extension arm may with equal facility be removed from the rocker arm. The extension may be employed in clamping small parts, as for instance a washer W in Fig. 1 that is to be drilled by the drill D, and the clamp may be adapted to various thicknesses of washers by vertically adjusting the bolt 17 and/or the pivot bearings 12 and 15 for the rocker arm and lever.

In clamping work beyond the adjustment of the clamp bolt, the bearings for the operating lever and the rocker arm may be vertically adjusted in the upright posts of the clamp frame to accommodate various sizes of work; and the V-block or work holder, which is adapted to receive round, square, hexagonal, and other shapes of work, is rotatably adjustable on its vertical axis to accommodate the work.

The clamping appliance thus described and illustrated is well adapted for use in holding work in horizontal as well as vertical planes, upon a drill press, milling machine, a planer, or other machine tool, and a maximum lever action with the expenditure of a minimum manual force is accomplished from the cam head and through the rocker arm and clamp bolt, or through the extension, for holding down the work.

Having thus fully described my invention, what I claim as new and desire to secure by Letters Patent is:

1. In a manually operated clamping appliance, the combination with a base having a work holder, and a clamp frame mounted on the base, of a pair of spaced upright posts rigid with said frame and a series of vertically spaced bearings in each post, a rocker arm pivotally mounted in a selected bearing of one post, a clamp bolt mounted in said arm for co-action with said work holder, an operating lever pivotally mounted in a selected bearing of the other post, and a cam head on said lever for co-action with said rocker arm.

2. In a manually-operated clamping appliance, the combination with a base having a socket, a work holder provided with a boss seated in said socket, an attaching bolt releasably securing said boss to said base, and a clamp frame mounted on said base, of a pair of spaced upright posts rigid with said frame and a series of vertically-spaced bearings in each post, a rocker arm pivotally mounted in a selected bearing of one post, a clamp bolt mounted in said arm for coaction with said work holder, an operating lever pivotally mounted in a selected bearing of the other post, and a cam head on said lever for coaction with said rocker arm.

3. In a manually operated clamping appliance, the combination with a base having a socket, a work holder provided with a boss seated in said socket, means for releasably securing said boss to said base, and a clamp frame mounted on said base, of a plurality of spaced upright posts projecting from said frame and a series of vertically spaced bearings in each post, a rocker arm pivotally mounted in a selected bearing of one post, a clamp bolt mounted in said arm for coaction with said work holder, an operating lever pivotally mounted in a selected bearing of the other post, and a cam head on said lever for coaction with said rocker arm.

SPENCER R. KELLER.

REFERENCES CITED

The following references are of record in the file of this patent:

UNITED STATES PATENTS

| Number | Name | Date |
|--------|------|------|
| 377,976 | Babcock | Feb. 14, 1888 |
| 897,641 | Moses | Sept. 1, 1908 |
| 1,758,733 | Cayo | May 10, 1930 |
| 2,061,718 | Stahl | Nov. 24, 1936 |
| 2,266,507 | Neumann | Dec. 16, 1941 |
| 2,365,385 | Booth | Dec. 19, 1944 |
| 2,390,022 | Wood | Nov. 27, 1945 |